UNITED STATES PATENT OFFICE.

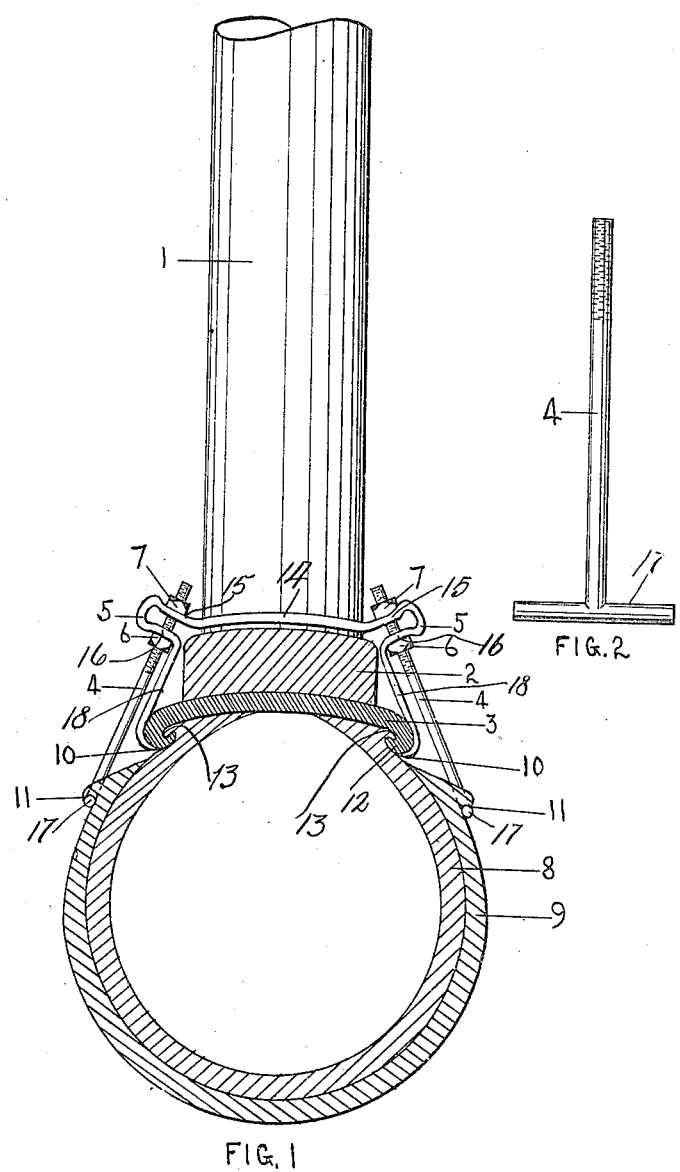

LAWRENCE E. SNIVELY, JR., OF GLENSIDE, PENNSYLVANIA.

TIRE-CLAMP.

1,226,270.      Specification of Letters Patent.      Patented May 15, 1917.

Application filed July 25, 1916. Serial No. 111,190.

*To all whom it may concern:*

Be it known that I, LAWRENCE E. SNIVELY, Jr., a citizen of the United States, residing at Glenside, in the county of Montgomery, State of Pennsylvania, have invented a new and useful Tire-Clamp, of which the following is a specification.

My invention consists of means for carrying and tightly clamping an auxiliary tire or other traveling surface as a sheath upon a tire proper.

The invention is satisfactorily illustrated in the accompanying drawing, but the important instrumentalities thereof may be varied, and so it is to be understood that the invention is not limited to the specific details shown and described.

Figure 1 represents a partial transverse section and a partial elevation of a tire clamp embodying my invention.

Fig. 2 represents an elevation on an enlarged scale of one of the T-bolts employed.

Referring to the drawings.

1 designates a portion of a spoke of a wheel, and 2 the felly thereof. 3 designates the rim of the wheel, the same being interposed between the felly 2 and the tire proper 8, the ends of said rim having thereon inturned flanges 12 which are adapted to engage with the shoulders 13 on the terminal portions of said tire proper 8, all as well known in the art.

14 designates clamps composed of cross bars which are adapted to be imposed on the periphery of the felly 2 and has on its ends the loops 5 through whose limbs 15 and 16 are passed the shanks of the T-bolts 4, which latter are provided with the tightening nuts 6 and 7 which are adapted to tighten against the opposite limbs of the loops 5.

Extending from the limbs 16 of the loops 5 are the legs 18 on whose terminals are the hooks 10 which are adapted to be anchored on the flanges 12 of the rim 3 and take firm hold of the same.

9 designates the auxiliary tire or traveling surface which is placed around the tire 8, and has on its exterior near its terminals the grooved shoulders 11 with which engage the heads 17 of the T-bolts 4, the shanks of the latter passing through said shoulders and also the limbs 15 and 16 of the loops 5 as has been stated.

It is evident that when the parts of the device are assembled, the rim 3 retains the tire 8 in position, and the heads of the bolts 4 take hold of the auxiliary tire 9. Then the nuts 7 are tightened against the limbs 15 of the loops 5, thereby drawing the heads 17 of the bolts 4 against the shoulders 11 of the auxiliary tire 9, closing said tire 9 tightly upon the tire 8 holding the former firmly and immovably in place.

The nuts 6 are then tightened whereby owing to the opposite nuts 7, the legs 18 are tightly anchored on said rim 3, thereby firmly locking the clamp 14 to the rim 3 and the felly 2, and so firmly holding the auxiliary tire in position, attention being directed to the fact that as the clamps 14 are firmly anchored on the fixed rim 3, said clamps are firmly held in position on the felly 2, and so the auxiliary tire 9 is prevented from shifting or creeping in any direction on the tire proper.

When the nuts 6 and 7 are loosened the bolts 4 are released, and so the auxiliary tire is removable from the tire proper.

Having thus described my invention what I claim as new and desire to secure by Letters Patent, is:—

1. In a wheel tire, a rim, an auxiliary tire adapted to be seated over the tire proper, a clamp bridging the rim and means carried by and adjustable in the clamp for engaging the auxiliary tire, said clamp having means for engagement with the rim.

2. In a wheel tire, a rim, an auxiliary tire adapted to be seated over the tire proper, a clamp bridging the rim and having lateral portions, extensions of said lateral portions engageable with the rim, and means adjustable in said lateral portions for engagement with said auxiliary tire.

3. In a wheel tire, a rim, a resilient clamp bridging the rim, an auxiliary tire adapted to be seated over the tire proper, and resilient means carried by said clamp for engaging said rim and additional means carried by and arranged substantially parallel with the first-named means for engaging said auxiliary tire.

4. In a wheel tire, a rim, an auxiliary tire adapted to be seated over the tire proper, a clamp bridging the rim and having lateral portions, extensions of said lateral portions terminating in hooks engageable with the rim, and means adjustable in said lateral portions for engagement with said auxiliary tire.

5. In a wheel tire, a tire proper, a rim, an auxiliary tire adapted to be fitted thereon, a clamp on the wheel, an anchoring device for the clamp engageable with said rim, said clamp having loops and bolt-like members extending through said loops and having at their outer ends means engageable with the auxiliary tire.

This specification signed and witnessed this twenty-first day of July, 1916.

L. E. SNIVELY, Jr.

Witnesses:
HARRY RENNINGER,
A. PATTERSON.